Patented Sept. 25, 1945

2,385,569

UNITED STATES PATENT OFFICE 2,385,569

PROCESS OF IMPROVING MILK, CREAM, CURD, AND CHEESE

Georg Friedel, Dresden, Germany; vested in the Alien Property Custodian

No Drawing. Application November 24, 1937, Serial No. 176,356. In Germany January 18, 1937

3 Claims. (Cl. 99—54)

This invention relates to a process for ensuring normal curdling of milk and normal acidification of milk, cream for butter making, curd and cheese.

Proper fermentation of lactic acid bacteria in the production of curds and cheese and in the acidification of cream requires the presence of certain organic salt compounds in the milk or cream, such as sodium, potassium or calcium compounds, phosphates, citrates, etc. between some of which and the albuminous and saccharine substances of the milk organic interaction occurs. All these substances grouped under the head of organic salt compounds serve as nutritive or buffer substances for the lactic acid bacteria, the yeasts and the mold fungi and ripening bacteria which are so important for the ripening of cheese.

These organic salt compounds are, moreover, equally important for precipitating the casein in the most perfect and proper manner possible and for obtaining the best possible yield of albumin.

The absence of these organic salt compounds has the effect of weakening the curdling tendency of milk and causes milk as well as cream, curds and cheese to become sluggish with respect to acidification and ripening, so that these products are no longer capable of ensuring proper fermentation of the lactic acid bacteria and subsequent ripening. Curdling capacity remain imperfect, the curd formed is too soft and the cheese obtained does not ripen normally, apart from the fact that the yield of casein is insufficient. The daily losses thus incurred in dairying are quite considerable.

The troubles mentioned are due more or less to the spread of intensive cultivation and dairying methods. Owing to the thorough utilization of pastures and arable soil, more mineral salt compounds are withdrawn from the soil than can be replaced by manuring and natural decomposition. Furthermore, milch cows are no longer fed exclusively with hay, grass, grain, turnips, concentrated feed, etc. as in former decades, but as a result of the increasing adoption of intensive cultivation sour fodder, as silage, acidified turnip waste, waste potatoes, etc. or fermented fodder like slops and grains is more and more used. In sour or fermented fodder, however, the content of organic salt compounds is either reduced or leached out, so that as a result thereof both the body of the cow and the milk become poor in these substances.

The bad results of inertness as to curdling and acidification are intensified still more by the necessary pasteurization of milk and cream. Some of the organic salt compounds are so sensitive that they are converted into insoluble and inactive compounds during the heating of the milk. These phenomena are generally known.

For many years past it has therefore been attempted to improve the curling and acidification capacity of such deficient ordinary milk or of heated milk by the subsequent addition of calcium salts, phosphates and citrates in a more or less chemically pure form. It has been found, however, that this is a relatively crude action with respect to the natural organic salt compounds present in milk which does not contain chemically pure calcium chloride, phosphates, citrates or other salts. All these organic salt compounds in the milk form rather a system which is only superficially known thus far and in which also the mutual combination of some of these compounds with the albuminous substances of the milk plays an important part. Nature has built up all these compounds in milk in a much finer way than that followed hitherto by man who simply adds chemically pure salts or salt compounds and believes he has imitated nature.

In order to supplement the natural occurrence of such salt compounds in milk by artificial intervention it is necessary to consider the more finely built up biologico-organic salt compounds prepared by vegetable or animal organisms and found for instance in saps obtained by pressing fresh grasses or leaves, such as cereals, leguminosae, trifolia, spinaciae and lettuces. Such compounds occur also in freshly obtained blood sera. These vegetable juices as well as the corresponding animal fluids disclose a finer biologico-organic composition of the salt content, which is utilized for instance by employing saps and sera in the preparation of nutrient media for bacterial cultures.

The invention desists from adding salt compounds produced in chemically pure form to the milk and is based upon the knowledge, backed by experience, that saps and blood sera are excellently suited for compensating the natural deficiency of biologico-organic salt compounds in milk and supplementing them in a perfectly natural manner. As the higher composition of the salt content of milk is just as little known at present as the higher composition of the salt content of saps and blood sera, a paraphrase of the term "salt content" whose vagueness is felt and admitted cannot be given. The invention does not include the known use of products like rennet enzymes, peptone, vitamins, pectins, acetic acid or alcohol, prepared in pure form from animal fluids or saps, but it covers, however, the liberation of the saps or animal fluids from ballast material, as cells, vegetable fibers, coloring matter, pectins, fat-albumin, starch, fibrin, etc., and the partial or total removal of excess water content.

The following examples have been found to give satisfactory results:

*Example 1*

100 kg. of fresh plants of the cereal or leguminosae species or an equal quantity of spinach or salads are gathered before inflorescence, reduced to small pieces and pressed in known manner to obtain the juice. Residual material is filtered off, and the juice is evaporated to dryness. The final product is a grey-green powder having a salty taste. 100 kg. of plants yield approximately 3 to 10 kg. of powder. 200 to 1,000 grams of this powder are added to 1,000 liters of milk or cream before acidification or curdling with rennet begins.

*Example 2*

The dried juice obtained according to Example 1 is added in quantities of 1,000 to 2,000 grams to 1,000 kg. of curd or cheese mass. The cheese is subsequently treated and molded in usual manner.

*Example 3*

Having been previously filtered 100 kg. of blood serum are evaporated to contain about 50% solid matter. This partly evaporated serum is then thoroughly mixed with the evaporated plant juice according to Example 1. In the proportions stated in Examples 1 and 2 the mixture is added to milk, curd or cheese, either before acidification and curdling with rennet begin or, in case of curds and cheese, prior to the beginning of the ripening process.

I claim:

1. The process of improving milk, cream, curd and cheese whose sensitivity of reaction with respect to acidification, curdling and ripening phenomena is deficient due to the lack of organic salt compounds of the milk constituents, consisting in incorporating with the milk, cream, curd, and cheese, organic salt compounds selected from the group of organic materials consisting of blood sera and concentrated purified sap obtained from the grasses and leaves freshly gathered before inflorescence.

2. The process of improving milk, cream, curd and cheese whose sensitivity of reaction with respect to acidification, curdling and ripening phenomena is deficient due to the lack of organic salt compounds of the milk constituents, consisting in incorporating with the milk, cream, curd and cheese, organic salt compounds from purified blood sera.

3. The process of improving milk, cream, curd and cheese whose sensitivity of reaction with respect to acidification, curdling and ripening phenomena is deficient due to lack of organic salt compounds of the milk constituents consisting in incorporating concentrated purified sap obtained from fresh grasses and leaves gathered before inflorescence.

GEORG FRIEDEL.